Oct. 19, 1971          E. F. ANDERSON          3,613,284
                        FISHING DEVICE
Filed June 3, 1969                              2 Sheets-Sheet 1
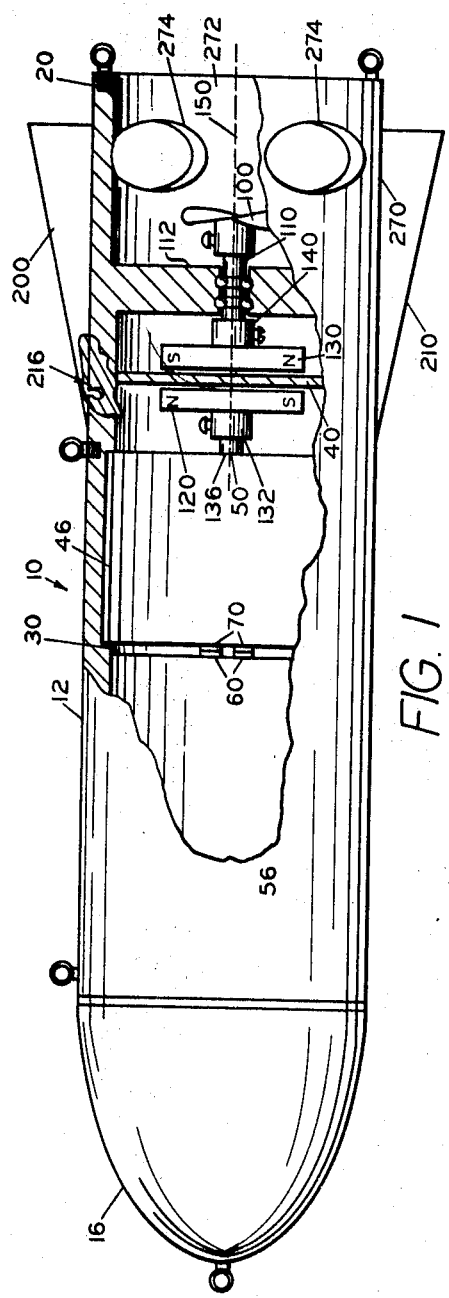
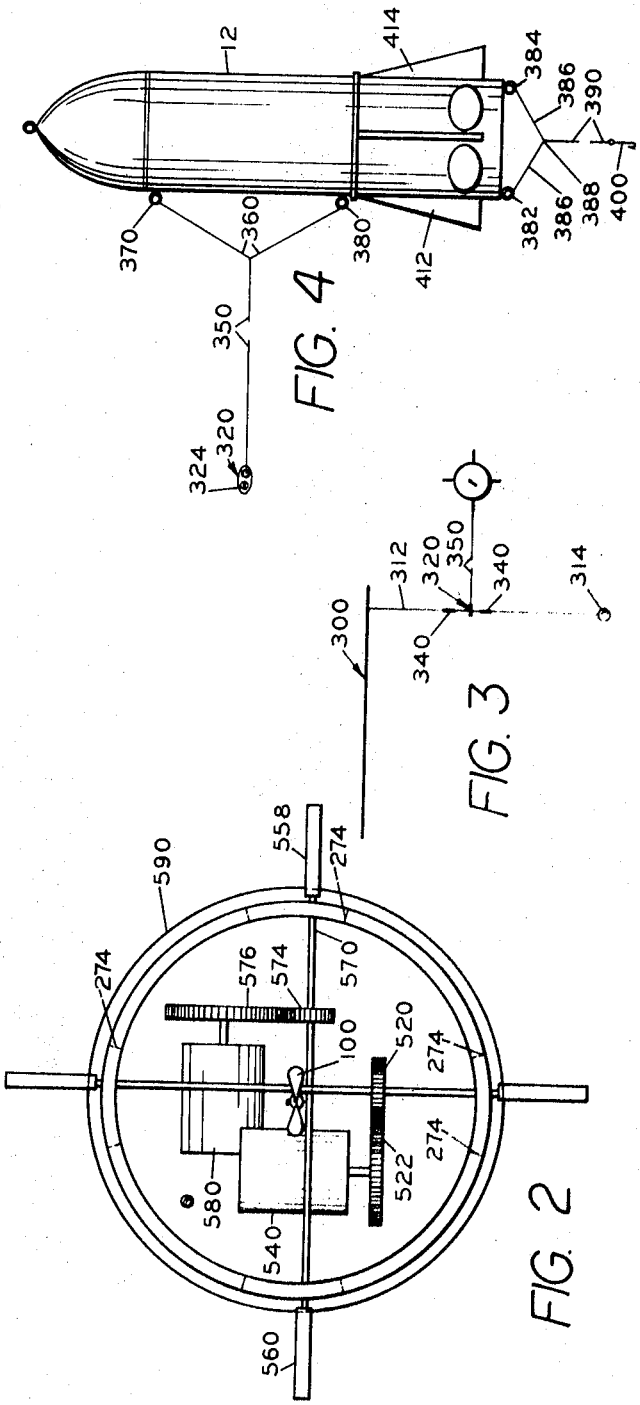
INVENTOR:
EDGAR ANDERSON

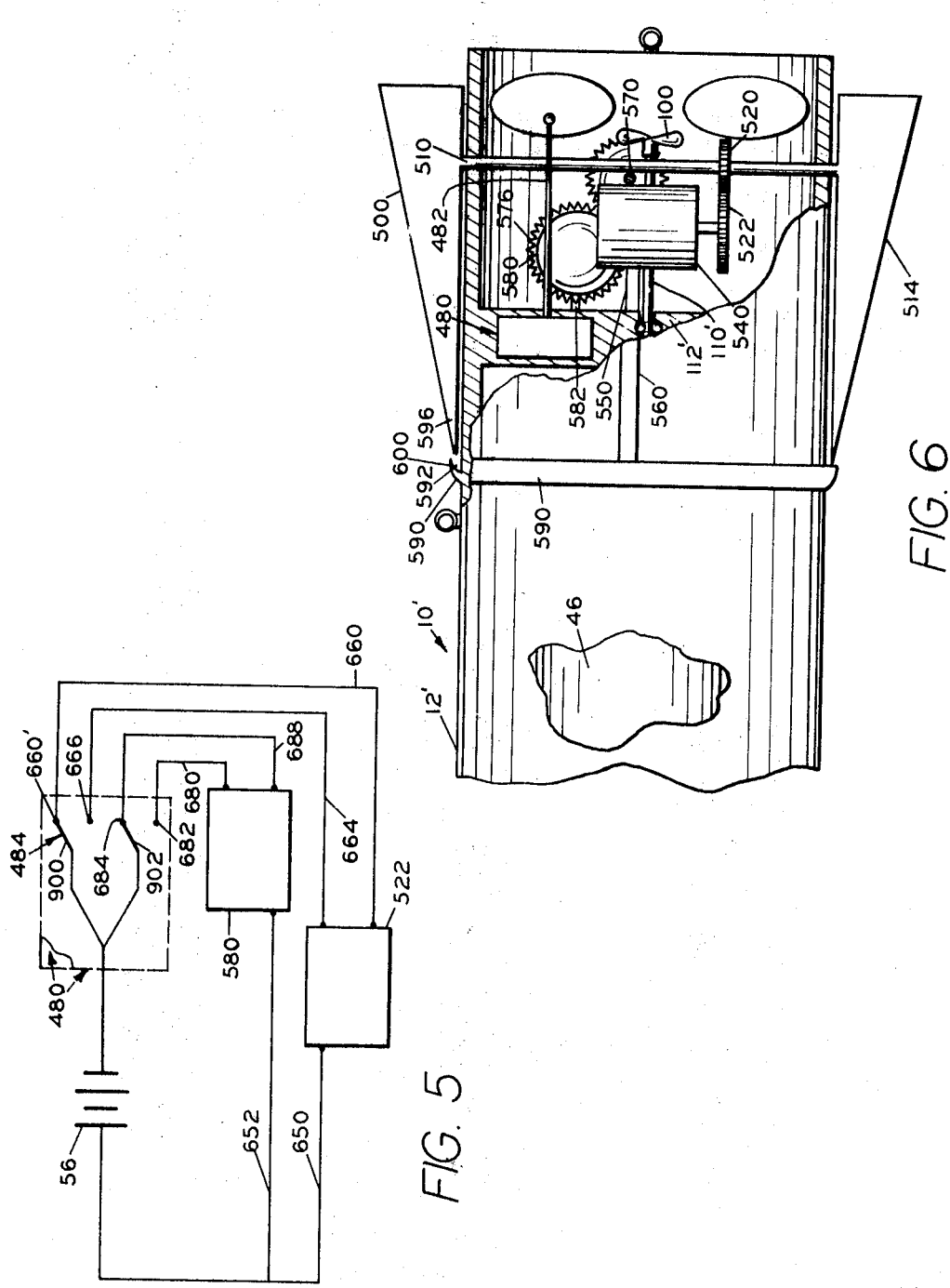

United States Patent Office 3,613,284
Patented Oct. 19, 1971

3,613,284
FISHING DEVICE
Edgar F. Anderson, Rte. 2, Box 11,
Wakefield, Nebr. 68784
Continuation-in-part of abandoned application Ser. No. 727,849, May 9, 1968. This application June 3, 1969, Ser. No. 840,091
Int. Cl. A01k 85/06
U.S. Cl. 43—26.1
6 Claims

ABSTRACT OF THE DISCLOSURE

A fishing device comprising a tiny motorized trolling submarine having remotely controlled rudder means for steering it upwardly and downwardly to fish at various depths.

The combination described in further combination with an upright line, a tethering line means attached to the submarine and revolvably attached to the upright line for causing the submarine to move in a circular motion about the upright line.

This application is a continuation-in-part of the applicant's co-pending now abandoned patent application Ser. No. 727,849, filed May 9, 1968, and titled, Boat.

FIELD OF THE INVENTION

This invention is in the field of fishing by means of a tethered remotely controlled motorized trolling device.

DESCRIPTION OF THE PRIOR ART

In the prior art, fishing with a moving bait has conventionally been accomplished by trolling, or secondly, by pulling the bait through the water by movement of the fishing pole, or thirdly, by casting and reeling in.

It has also been proposed heretofore that a small trolling boat of toy size be attached to a fish line for giving the bait motion, in which case, the tethering line for the trolling boat extends up to the fish pole itself or else to the hands of the operator.

It has long been recognized that fish are at different depths at different times of the day and usually a fisherman must experiment to discover the depth at which to fish. Nevertheless, no trolling boats of the prior art have had a way to adjust the depth of fishing without the labor of constantly bringing the troller back in to the fisherman for a manual adjustment of the length of a weighted hook. This was because such trollers were mere surface travelers, or in other words, small boats.

SUMMARY OF THE INVENTION

A fishing device comprising a tiny motorized trolling submarine having remotely controlled rudder means for steering it upwardly and downwardly to fish at various depths.

The combination described in further combination with an upright line, a tethering line means attached to the submarine and revolvably attached to the upright line for causing the submarine to move in a circular motion about the upright line.

The combination in which the upright line is attached to a fish pole.

An object is to make it possible to adjust the depth of fishing of an orbiting troller continually with ease and without the necessity of having to bring the troller all the way back to the fisherman for continual depth adjustment of a weighted hook.

The prior art is completely lacking in any record of means for depth control of a mini-troller and it is an object to provide this new conception.

The fishing device described in which the boat steering rudder means is also adapted to guide the boat in upward and downward directions, and further in which remote control means is provided so that a fisherman can control upward and downward motion of the boat.

BRIEF DESCRIPTION OF THE DRAWING

FIG. 1 is a side elevation of the boat of this invention shown with a portion of its housing broken away and also with a portion of one of its rudders broken away for showing other parts in section.

FIG. 2 is a rear elevation of the modification of the boat as it would be seen from the right-hand side of FIG. 6.

FIG. 3 is a detail showing a manner in which the boat could be mounted on a fish line.

FIG. 4 is a top plan view of the boat shown in a fishing assembly with a trolling fish hook and with a control harness attaching the boat to a swivel fitting.

FIG. 5 is a wiring diagram of a boat.

FIG. 6 is a detail of a modification of the boat shown with the housing partly broken away for revealing mechanism for the radio control of rudders.

DESCRIPTION OF THE PREFERRED EMBODIMENTS

Referring to FIG. 1, the boat of this invention is there generally indicated at 10 having a housing or hull 12 which is elongated and which has a forward end 16 and a rearward end 20.

The hull 12 has within it a compartment 30 which is water-tight and which has an outer wall 40 at the rearward end of the compartment 30, the wall 40 being vertical and transverse with respect to the length of the boat.

Within the compartment 30 is a motor 46 which is preferably electrical and which has a drive shaft 50 extending rearwardly. Also disposed in the compartment 30 is a battery 56 having electrical connection to the motor 46 in any suitable manner, and as the manner is not important here except to illustrate one way in which this could be done, the battery is provided with two terminals 60 which are adapted to engage two terminals 70, which latter are connected to the motor 46.

A propeller 100 faces rearwardly and is mounted on a propeller shaft 110, which latter is rotatably mounted in a portion 112 of the hull 12. A first magnet 120 is disposed on the inner side of the wall 40 and a second magnet 130 is disposed on the outer side of the wall 40. The first magnet 120 is connected by a hub 132 to the drive shaft 50 for rotation about an axis 136, called a first axis.

The second magnet 130 is attached by a hub 140 to the shaft 110 for rotating about a second axis 150.

The first and second magnets 120 and 130 are each elongated transversely of the hull 12, whereby each of the magnets has a north pole on one of its ends and a south pole on the other of its ends, whereby the first and second magnets 120 and 130 are operatively correlated so that when the first magnet 120 rotates about the first axis 136, the second magnet 130 will be caused to rotate about the second axis 150. The wall 40 is sufficiently thin and the magnets 120 and 130 sufficiently close to opposite sides of the wall 40, as to maintain a desired amount of magnetic interaction between the magnets for transferring drive from one to the other.

Also in FIG. 1 a pair of rudders can be seen at 200 and 210, the rudders shown being disposed at the top and bottom of the hull 12, and each being pivotally mounted on the hull 12 by suitable pivot means generally indicated at 216 in FIG. 1 and being preferably a ball and socket joint 216 having a tight fit so that if a rudder is manually placed in a certain position, it will tend to stay in that position for continually steering the hull in a same way until it is readjusted.

The propeller 100 is surrounded by an annular housing portion 270 which opens at its rearward end in an opening 272, the housing portion 270 having transverse openings 274 therethrough for letting water therein for the efficient action of the propeller 100.

Referring to FIG. 3, one use of the boat of this invention is there shown in which the outer end of a fish pole is indicated at 300 having a downwardly depending line 312 held vertical by a weight at its lower end and shown at 314.

At a midpoint on the line 312, a swivel 320 is provided having a vertical opening 324 therethrough, as best seen in FIG. 4.

The swivel 320 is prevented from vertical movement excessively on the line 312 by stops 340. The swivel 320 has a flexible tethering line 350 connected to it and extending horizontally over to a pair of harness lines 360 attached thereto and which latter extend outwardly, forwardly, and rearwardly to a pair of eyes 370 and 380 mounted forwardly and rearwardly of each other respectively on the hull 12.

On the rearward end of the hull 12 are a pair of trolling eyes 382 and 384 having towing lines 386 attached thereto and extending rearwardly therefrom to a connecting point 388 with the trolling line 390 extending rearwardly therefrom to a fish hook 400. As thus described, the boat becomes an effective fishing device adapted to troll at a selected depth for providing a motion to the hook 400 which it would not have if it were connected directly to the line 312 of the fish pole 300.

FIG. 4 also shows a pair of side rudders 412 and 414, which latter are each to be understood as pivotally connected to the sides of the hull 12 in the same way as the rudder 200 is attached to the top of the hull, whereby all rudders are adjustable for controlling motion of the boat upwardly, downwardly, and to each side.

Referring now to FIG. 6, a modification of the boat of FIG. 1 is there shown in which the wall 112 is called 112' only because it has mounted within it a radio receiver switch mechanism generally indicated at 480 and which can be of any suitable design adapted to receive radio signals through an antenna 482 and adapted to utilize the radio signals to control a double-pull double-throw switch assembly 484, as seen in FIG. 5, and later described.

Referring now to FIG. 6 again, we see the propeller 100 in generally the same position as in FIG. 1, but extending slightly further rearwardly because of a longer propeller shaft 110' driven exactly as is the shaft 110, whereby most parts of the modified boat 10' of FIG. 6 are not shown in detail since they are the same as in the modification of FIG. 1.

In FIG. 6, it will be seen that an upper rudder 500 is disposed in a vertical plane and is connected to a shaft 510 which extends completely through the hull 12' and is also connected to a lower rudder 514 which is also disposed in a vertical plane, whereby the rudders 500 and 514 are controllable in their rotation by the position of the shafts 510 which has on it a gear 520 driven by a second and larger gear 522 drivably mounted on an electrical motor 540, which latter is of a reversible type and is mounted on the hull by any suitable mounting means such as shown at 550.

The right and left rudders 558 and 560 are likewise mounted on a second rudder shaft 570 extending horizontally through the hull, as best seen in FIG. 2, the shaft 570 having a small gear 574 thereon driven by a larger gear 576, which latter is drivably mounted on a second motor 580 secured to the hull by any suitable means for mounting it, such as a bracket 582, best seen in FIG. 6.

A weed protection guard ring 590 surrounds the hull as best seen in FIG. 6, and will be found to have an annular cavity 592 in its rearward side which can receive the pointed forward ends 596 of the respective rudders with the outer end 600 of the ring extending away from the hull 12' farther than the forward end of the respective rudders on any side of the boat so as to keep weeds from collecting on and under the forward ends of the rudders.

Referring to FIG. 5 in the wiring diagram, it will be seen that each of the motors has three terminals since they are reversible motors. A wire 650 connects a terminal of the motor 522 to one terminal of the battery 56 and the wire 652 connects one terminal of the motor 580 with the wire 650. A wire 660 connects another terminal with a motor 522 of the stationary terminal 660' of the switch 484 and the wire 664 connects a third terminal of the motor 552 with a second fixed terminal 666 of the switch 484.

A wire 680 connects a terminal of the motor 580 with a fixed terminal 682 of the switch means 484, and a fourth terminal 684 of the switch means 484 is connected to the third terminal of the motor 580 by a wire 688.

It is to be understood that the radio signal controlled switch assembly 480 is indicated in FIG. 5 as being the dotted rectangle 480.

A portion of the radio signal operated switch assembly 480 is shown in full lines in FIG. 5 to indicate that it is an important part of the boat, but that since such assemblies are common and are used for radio controlled switching in many places, such as the control of toy aircraft from the ground, therefore, it is believed unnecessary that the switching device 480 be more specifically shown and is indicated diagrammatically in FIG. 5.

In the operation of the assembly 480, the switch throw 900 is independently controllable by remote radio signal from the switch throw 902, and it will be understood that each of the throws can be caused to be switched between their respective terminals so that the throw 900 can be contacting either the terminal 660' or the terminal 666 for causing the motor 522 to operate in one direction or the other, as it is reversible.

Likewise, the throw 902 can contact either the terminal 682 or the terminal 684 for causing the motor 580 to rotate in one direction or the other to control the rudders to which it is attached for turning the hull in either of two ways.

Each of the magnets 120 and 130 has a north pole on one side of its axis and a south pole on the opposite side of its axis and each of the magnets is free of any other magnetic means in the swath of rotation thereof and mechanically connected to its same shaft 50 and 110.

I claim:

1. A fishing device comprising: a tiny motorized submarine for trolling, said submarine having a substantially water-tight hull and being adapted to travel beneath the surface of the water, propulsion means on said submarine controlled by the motor thereof, a fish hook and line assembly attached to and trolling behind said submarine, said submarine having steering means thereon adapted to guide the submarine upwardly and downwardly, remote control means operably correlated with said means for steering said submarine upwardly and downwardly whereby a fisherman can cause said submarine to move upwardly and downwardly in the water from a point remote from the submarine, and a tethering line means having one end connected to a side of said submarine troller for making it possible to retrieve said submarine troller.

2. The combination of claim 1 in which said remote control for said steering means comprises radio receiver means in said hull controlling said steering means.

3. The combination of claim 1 in which said submarine further has steering means adapted for guiding said submarine troller in a horizontal plane.

4. The fishing device of claim 1 further comprising: a generally upright line, a weight at the bottom of said upright line, means supporting the top of said upright line, said tethering line means extending transversely to said submarine troller and to said upright line, eyelet means receiving said upright line therethrough and revolvably connecting the other end of said tethering line means to said upright line.

5. The combination of claim 4 in which a fish pole is attached to the upper end of said upright line.

6. The combination of claim 1 in which said remote control for said upward and downward steering means comprises electrical motor means, switch means in said submarine troller for controlling said electrical motor means, and radio receiver means in said submarine troller controlling said switch means.

References Cited

UNITED STATES PATENTS

| 2,382,677 | 8/1945 | Thomas | 43—43.51 |
| 3,099,099 | 7/1963 | Cahen et al. | 43—26.2 |

FOREIGN PATENTS

| 764,665 | 8/1967 | Canada | 43—26.2 |
| 612,106 | 7/1926 | France | 43—26.2 |

WARNER H. CAMP, Primary Examiner